US008953597B2

(12) United States Patent
Chen et al.

(10) Patent No.: US 8,953,597 B2
(45) Date of Patent: *Feb. 10, 2015

(54) COMPUTING POINT-TO-MULTIPOINT PATHS

(75) Inventors: Huaimo Chen, Bolton, MA (US); Qianglin Quintin Zhao, Boxborough, MA (US); Hua Autumn Liu, Boxborough, MA (US)

(73) Assignee: Futurewei Technolgies, Inc., Plano, TX (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/286,923

(22) Filed: Nov. 1, 2011

(65) Prior Publication Data

US 2012/0057593 A1    Mar. 8, 2012

Related U.S. Application Data

(63) Continuation of application No. 12/404,100, filed on Mar. 13, 2009, now Pat. No. 8,064,447.

(60) Provisional application No. 61/040,102, filed on Mar. 27, 2008.

(51) Int. Cl.
*H04L 12/28* (2006.01)
*H04L 12/56* (2006.01)
(Continued)

(52) U.S. Cl.
CPC ............... *H04L 45/42* (2013.01); *H04L 12/18* (2013.01); *H04L 45/28* (2013.01); *H04L 45/22* (2013.01)
USPC ........... 370/390; 370/228; 370/236; 370/255; 370/389; 370/397; 370/395.53; 370/396; 370/399; 370/401; 370/408; 370/221; 370/351

(58) Field of Classification Search
CPC ..... H04L 45/04; H04L 47/11; H04L 41/0677; H04L 43/0817; H04L 47/724; H04L 45/22; H04L 45/28; H04L 12/18; H04L 45/42; H04L 45/02
USPC .................................................. 370/228–463
See application file for complete search history.

(56) References Cited

U.S. PATENT DOCUMENTS 5,805,805 A    9/1998  Civanlar et al.
6,353,596 B1 *  3/2002  Grossglauser et al. ....... 370/256
(Continued)

FOREIGN PATENT DOCUMENTS

CN    1866852 A    11/2006
CN    101286863 A    10/2008
(Continued)

OTHER PUBLICATIONS

Office Action dated Jan. 4, 2011, 15 pages, U.S. Appl. No. 12/404,100, filed Mar. 13, 2009
(Continued)

*Primary Examiner* — Venkatesh Haliyur
(74) *Attorney, Agent, or Firm* — Conley Rose, P.C.; Grant Rodolph; William H. Dietrich

(57) ABSTRACT

An apparatus comprising a path computation element (PCE) configured to communicate with a path computation client (PCC) and compute a point-to-multipoint (P2MP) path across an autonomous system (AS) domain. Also included is a network component comprising at least one processor configured to implement a method comprising obtaining a computation request for a P2MP path across a plurality of AS domains, attempting to calculate the P2MP path across the AS domains, thereby generating a computed path or a failure reason, and transmitting a reply comprising the computed path or an indication of the failure reason. Included is a method comprising exchanging a request message and a reply message about a P2MP path across an AS domain between a PCC and a PCE.

19 Claims, 3 Drawing Sheets

(51) Int. Cl.

| | | |
|---|---|---|
| H04L 12/46 | (2006.01) | |
| H04L 12/26 | (2006.01) | |
| H04L 12/717 | (2013.01) | |
| H04L 12/18 | (2006.01) | |
| H04L 12/703 | (2013.01) | |
| H04L 12/707 | (2013.01) | |

(56) References Cited

U.S. PATENT DOCUMENTS

| | | | |
|---|---|---|---|
| 6,757,286 B1* | 6/2004 | Stone | 370/395.53 |
| 7,031,262 B2* | 4/2006 | Vasseur et al. | 370/248 |
| 7,233,571 B1 | 6/2007 | Krishnamurthy et al. | |
| 7,463,591 B1 | 12/2008 | Kompella et al. | |
| 7,599,349 B2* | 10/2009 | Vasseur et al. | 370/351 |
| 7,606,186 B2 | 10/2009 | Hundscheudt et al. | |
| 7,701,940 B2* | 4/2010 | Novello et al. | 370/390 |
| 7,746,796 B2 | 6/2010 | Swallow et al. | |
| 7,801,048 B1* | 9/2010 | Sivabalan et al. | 370/238 |
| 7,978,622 B2* | 7/2011 | Zhang | 370/252 |
| 8,064,447 B2* | 11/2011 | Chen et al. | 370/390 |
| 8,077,713 B2* | 12/2011 | Vasseur et al. | 370/390 |
| 8,254,272 B1* | 8/2012 | Vasseur | 370/248 |
| 8,351,418 B2* | 1/2013 | Zhao et al. | 370/351 |
| 2005/0259664 A1* | 11/2005 | Vasseur et al. | 370/395.52 |
| 2006/0039391 A1* | 2/2006 | Vasseur et al. | 370/409 |
| 2007/0165657 A1 | 7/2007 | Smith et al. | |
| 2008/0089346 A1 | 4/2008 | Lee | |
| 2008/0123521 A1 | 5/2008 | Vasseur et al. | |
| 2008/0151896 A1* | 6/2008 | Zhang | 370/392 |
| 2008/0205271 A1* | 8/2008 | Aissaoui et al. | 370/235 |
| 2008/0219268 A1 | 9/2008 | Dennison | |
| 2008/0219272 A1* | 9/2008 | Novello et al. | 370/401 |
| 2009/0067348 A1* | 3/2009 | Vasseur et al. | 370/256 |
| 2009/0245253 A1* | 10/2009 | Chen et al. | 370/390 |
| 2010/0177631 A1 | 7/2010 | Chen et al. | |
| 2010/0208733 A1* | 8/2010 | Zhao et al. | 370/390 |
| 2011/0032936 A1 | 2/2011 | Ashwood-Smith et al. | |
| 2011/0044352 A1* | 2/2011 | Chaitou et al. | 370/408 |
| 2011/0199891 A1 | 8/2011 | Chen | |
| 2011/0211445 A1* | 9/2011 | Chen | 370/221 |
| 2012/0057593 A1* | 3/2012 | Chen et al. | 370/390 |
| 2012/0092986 A1* | 4/2012 | Chen | 370/228 |
| 2013/0016605 A1* | 1/2013 | Chen | 370/221 |

FOREIGN PATENT DOCUMENTS

| | | | | |
|---|---|---|---|---|
| EP | 1883181 A1 | 1/2008 | | |
| WO | 2006122506 A1 | 11/2006 | | |
| WO | WO 2009115726 A1 * | 9/2009 | | H04L 12/56 |
| WO | 2009117971 A1 | 10/2009 | | |

OTHER PUBLICATIONS

Office Action dated Jun. 10, 2011, 19 pages, U.S. Appl. No. 12/404,100, filed Mar. 13, 2009.
Notice of Allowance dated Sep. 26, 2011, 13 pages, U.S. Appl. No. 12/404,100, filed Mar. 13, 2009.
Foreign Communication From a Related Counterpart Application, PCT Application PCT/CN2009/071043, Written Opinion dated Jun. 25, 2009, 7 pages.
Ayyangar, A., et al., "Label Switched Path Stitching With Generalized Multiprotocol Label Switching Traffic Engineering (GMPLS TE)," draft-ietf-ccamp-lsp-stitching-06.txt, Apr. 2007, 20 pages.
Bryskin, I., et al., "Policy-Enabled Path Computation Framework," draft-ietf-pce-policy-enabled-path-comp-03.txt, Oct. 31, 2007, 35 pages.
Bryskin, I., et al., "Policy-Enabled Path Computation Framework," draft-ietf-pce-policy-enabled-path-comp-04.txt, Oct. 31, 2008, 37 pages.
Farrel, A., "Reduced Backus-Naur Form (RBNF) a Syntax Used in Various Protocol Specifications," draft-farrel-rtg-common-bnf-08.txt, Feb. 5, 2009, 15 pages.

Koushik, A.S.K., et al., "PCE Communication Protocol (PCEP) Management Information Base," draft-kkoushik-pce-pcep-mib-01.txt, Jul. 8, 2007, 19 pages.
Koushik, A.S.K., et al., "PCE Communication Protocol (PCEP) management Information Base," draft-kkoushik-pce-pcep-mib-02.txt, Nov. 3, 2008, 22 pages.
Koushik, A.S.K., et al., "PCE Communication Protocol (PCEP) Management information Base," draft-ietf-pce-pcep-mib-01.txt, Mar. 8, 2010, 24 pages.
Koushik, A.S.K., et al., "PCE Communication Protocol Management Information Base," draft-ietf-pce-pcep-mib-02.txt, Jul. 6, 2010, 26 pages.
Leroux, J.L., et al., "Encoding of Objective Functions in Path Computation Element Communication Protocol (PCEP)," draft-ietf-pce-of-01.txt, Nov. 2007, 18 pages.
Leroux, J.L., et al., "Encoding of Objective Functions in Path Computation Element Communication Protocol (PCEP)," draft-ietf-pce-of-02.txt, Mar. 2008, 18 pages.
Leroux, J.L., et al., "Encoding of Objective Functions in the Path Computation Element Communication Protocol," draft-ietf-pce-of-05.txt, Sep. 6, 2008, 19 pages.
Leroux, J.L., et al., "Encoding of Objective Functions in the Path Computation Element Communication Protocol (PCEP)," draft-ietf-pce-of-06.txt, Dec. 27, 2008, 21 pages.
Nishioka, I., et al., "The Use of SVEC (Synchronization VECtor) List for Synchronized Dependent Path Computations," draft-nishioka-pce-svec-list-01.txt, Nov. 2007, 10 pages.
Nishioka, I., et al., "The Use of SVEC (Synchronization VECtor) List for Synchronized Dependent Path Computations," draft-nishioka-pce-svec-list-02.txt, Jul. 4, 2008, 15 pages.
Nishioka, I., et al., "The Use of SVEC (Synchronization VECtor) List for Synchronized Dependent Path Computations," draft-ietf-pce-pcep-svec-list-00.txt, Sep. 29, 2008, 15 pages.
Nishioka, I., et al., "The Use of SVEC (Synchronization VECtor) List for Synchronized Dependent Path Computation," draft-ietf-pce-pcep-svec-list-01.txt, Mar. 9, 2009, 14 pages.
Touch, J., et al., " The TCP Authentication Option," draft-ietf-tcpc-tcp-auth-opt-00.txt, Nov. 11, 2007, 32 pages.
Touch, J., et al., "The TCP Authentication Option," draft-ietf-tcpm-tcp-auth-opt-04.txt, Mar. 9, 2009, 49 pages.
Touch, J., et al., "The TCP Authentication Option," draft-ietf-tcmp-tcp-auth-opt-11.txt, Mar. 23, 2010, 49 pages.
Vasseur, J.P., Ed., et al., Path Computations Element (PCE) Communication Protocol (PCEP) Version 1, draft-vasseur-pce-pcep-02.txt, Sep. 2005, 46 pages.
Vasseur, J.P., Ed., et al., "Path Computation Protocol (PCEP)," draft-ietf-pce-pcep-12.txt, Mar. 24, 2008, 70 pages.
Vasseur, J.P., Ed., et al., "Path Computation Element (PCE) Communication Protocol (PCEP)," draft-ietf-pce-pcep-15.txt, Sep. 9, 2008, 81 pages.
Vasseur, J.P., Ed., et al., "Path Computation Element (PCE) Communication Protocol (PCEP)," draft-ietf-pce-pcep-16.txt, Oct. 14, 2008, 87 pages.
Vasseur, J.P., Ed., et al., "A Per-Domain Path Computation Method for Establishing Inter-Domain Traffic Engineering (TE) Label Switched Paths (LSPs)," draft-ietf-ccamp-inter-domain-pd-path-comp-06.txt, Nov. 16, 2007, 24 pages.
Vasseur, J.P., Ed., et al., "A Backward Recursive PCE-Based Computation (BRPC) Procedure to Compute Shortest Constrained Inter-Domain Traffic Engineering Label Switched Paths," draft-ietf-pce-brpc-09.txt, Apr. 14, 2008, 21 pages.
Yasukawa, S., et al., "Applicability of the Path Computation Element (PCE) to point-to-Multipoint (P2MP) Multiprotocol Label Switching (MPLS) and Generalized MPLS (GMPLS) Traffic Engineering (TE)," draft-yasukawa-pce-p2mp-app-02.txt, Feb. 15, 2008, 15 pages.
Yasukawa, S., et al., "PCC-PCE Communication Requirements for Point to Multipoint Multiprotocol Label Switching Traffic Engineering (MPLS-TE)," draft-yasukawa-pce-p2mp-req-05.txt, May 12, 2008, 11 pages.
Yasukawa, S., et al., "Applicability of the Path Computation Element (PCE) to point-to-Multipoint (P2MP) Multiprotocol Label Switch-

(56) References Cited

OTHER PUBLICATIONS ing (MPLS) and Generalized MPLS (GMPLS) Traffic Engineering (TE)," draft-ietf-pce-p2mp-app-00.txt, Aug. 8, 2008, 15 pages.

Yasukawa, S., et al., "Applicability of the Path Computation Element (PCE) to point-to-Multipoint (P2MP) Multiprotocol Label Switching (MPLS) and Generalized MPLS (GMPLS) Traffic Engineering (TE),"draft-ietf-pce-p2mp-app-01.txt, Feb. 13, 2009, 17 pages.

Yasukawa, S., et al., "Applicability of the Path Computation Element (PCE) to point-to-Multipoint (P2MP) Multiprotocol Label Switching (MPLS) and Generalized MPLS (GMPLS) Traffic Engineering (TE)," draft-ietf-pce-p2mp-app-02.txt, Aug. 17, 2009, 16 pages.

Yasukawa, S., et al., "PCC-PCE Communication Requirements for Point to Multipoint Multiprotocol Label Switching Traffic Engineering (MPLS-TE)," draft-ietf-pce-p2mp-req-00.txt, Aug. 8, 2008, 11 pages.

Kompella, K., et al., "Label Switched Paths (LSP) Hierarchy With Generalized Multi-Protocol Label Switching (GMPLS) Traffic Engineering (TE)," RFC 4206, Oct. 2005, 14 pages.

Zhang, R., Ed., et al., "MPLS Inter-Autonomous System (AS) Traffic Engineering (TE) Requirements," RFC 4216, Nov. 2005, 28 pages.

Farrel, A., et al., "A Path Computation Element (PCE)-Based Architecture," RFC 4655, Aug. 2006, 38 pages.

Ash, J., Ed., et al., "Path Computation Element (PCE) Communication Protocol generic Requirements," RFC 4657, Sep. 2006, 21 pages.

Farrel, A., et al., "A Framework for Inter-Domain Multiprotocol Label Switching Traffic Engineering," RFC 4726, Nov. 2006, 21 pages.

Berger, L., et al., " GMPLS Segment Recovery," RFC 4873, May 2007, 26 pages.

Aggarwal, R., Ed., et al., "Extensions to Resource Reservation Protocol—Traffic Engineering (RSVP-TE) for Point-to-MultiPoint TE Label Switched Paths (LSPs)," RFC 4875, May 2007, 50 pages.

Lindem, A., Ed., et al., "Extensions to OSPF for Advertising Optional Router Capabilities," RFC 4970, Jul. 2007, 14 pages.

Yasukawa, S., et al., "PCC-PCE Communication Requirements for Point to Multipoint Multiprotocol Label Switching Traffic Engineering (MPLS-TE)," draft-ietf-pce-p2mp-req-01.txt, Feb. 13, 2009, 13 pages.

Yasukawa, S., et al., "PCC-PCE Communication Requirements for Point to Multipoint Multiprotocol Label Switching Traffic Engineering (MPLS-TE)," draft-ietf-pce-p2mp-req-03.txt, 12 pages, Oct. 16, 2009.

Yasukawa, S., et al., "PCC-PCE Communication Requirements for Point to Multipoint Multiprotocol Label Switching Traffic Engineering (MPLS-TE)," draft-ietf-pce-p2mp-req-04.txt, Dec. 4, 2009, 12 pages.

Yasukawa, S., et al., "PCC-PCE Communication Requirements for Point to Multipoint Multiprotocol Label Switching Traffic Engineering (MPLS-TE)," draft-ietf-pce-p2mp-req-05.txt, Jan. 29, 2010, 12 pages.

Zhao, Q., et al., "Extensions to the Path Computation Element Communication Protocol (PCEP) for Point-to-Multipoint Traffic Engineering Label Switched Paths," draft-zhao-pce-pcep-extension-p2mp-00.txt, Feb. 17, 2008, 18 pages.

Zhao, Q., et al., "Extensions to the Path Computation Element Communication Protocol (PCEP) for Point-to-Multipoint Traffic Engineering Label Switched Paths," draft-ietf-pce-pcep-p2mp-extensions-00.txt, Sep. 9, 2008, 26 pages.

Zhao, Q., et al., "Extensions to the Path Computation Element Communication Protocol (PCEP) for Point-to-Multipoint Traffic Engineering Label Switched Paths," draft-ietf-pce-pcep-p2mp-extensions-02.txt, Mar. 8, 2009, 25 pages.

Bradner, S., "Key Words for Use in RFCs to Indicate Requirement Levels," RFC 2119, Mar. 1997, 3 pages.

Awduche, D., et al., "RSVP-TE: Extensions to RSVP for LSP Tunnels," RFC 3209, Dec. 2001, 57 pages.

Berger, L., Ed., et al., Generalized Multi-Protocol Label Switching (GMPLS) Signaling Resource Reservation Protocol-Traffic Engineering (RSVP-TE) Extensions, RFC 3473, Jan. 2003, 43 pages.

Leroux, J.L., Ed., et al., "Requirements for Inter-Area MPLS Traffic Engineering," RFC 4105, Jun. 2005, 21 pages.

Vasseur, J.P., Ed., et al., "IGP Routing Protocol Extensions for Discovery of Traffic Engineering Node Capabilities," RFC 5073, Dec. 2007, 13 pages.

Le Roux, J.L., Ed., et al., "OSPF Protocol Extensions for Path Computation Element (PCE) Discovery," RFC 5088, Jan. 2008, 19 pages.

Le Roux, J.L., Ed., et al., " IS-IS Protocol Extensionsb for Path Computation Element (PCE) Discovery," RFC 5089, Jan. 2008, 16 pages.

Bryskin, I., et al., "Policy Enabled Path Computation Framework," RFC 5394, Dec. 2008, 37 pages.

Vasseur, J.P., Ed., et al., "Path Computation Element (PCE) Communication Protocol (PCEP)," RFC 5440, 88 pages, Mar. 2009.

Farrel, A., "Routing Backus-Naur Form (RBNF): A Syntax Used to Form Encoding Rules in Various Routing Protocol Specifications," RFC 5511, Apr. 2009, 15 pages.

Leroux, J.L., et al., "Encoding of Objective Functions in the Path Computation Element Communication Protocol (PCEP)," RFC 5541, Jun. 2009, 24 pages.

Yasukawa, S., et al., "Applicability of the Path Computation Element (PCE) to Point-To-Multipoint (P2Mp) MPLS and GMPLS Traffic Engineering (TE)," RFC 5671, Oct. 2009, 16 pages.

Yasukawa, S., et al., "Path Computation Clients (PCC)—Path Computation Element (PCE) Requirements for Point-To-Multipoint MPLS-TE," RFC 5862, Jun. 2010, 11 pages.

Touch, J., et al., "The TCP Authentication Option," RFC 5925, Jun. 2010, 49 pages.

Foreign Communication From a Related Counterpart Application, PCT Application PCT/CN2009/071043, International Search Report dated Jun. 25, 2009, 4 pages.

\* cited by examiner

COMPUTING POINT-TO-MULTIPOINT PATHS

CROSS-REFERENCE TO RELATED APPLICATIONS

The present application is a continuation of U.S. Non-Provisional patent application Ser. No. 12/404,100 filed Mar. 13, 2009 by Huaimo Chen et al. and entitled "System and Method for Computing Point-to-Multipoint Label Switched Paths," which claims priority to U.S. Provisional Patent Application No. 61/040,102 filed Mar. 27, 2008 by Huaimo Chen et al. and entitled "System and Method for Computing Point-to-Multipoint Label Switched Paths," both of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks and Generalized MPLS (GMPLS) networks, a Traffic Engineering (TE) Label Switched Path (LSP) can be established by MPLS (GMPLS) with a path provided by a Path Computation Client (PCC) and a Path Computation Element (PCE). Specifically, the PCC requests a path or route from the PCE, which computes the path and forwards the computed path information back to the PCC. The path can be a point-to-point (P2P) path, which is computed across single or multiple areas or Autonomous System (AS) domains. The path can comprise a plurality of nodes and/or Label Switch Routers (LSRs) and extend from a source node or LSR to a destination node or LSR. Further, a plurality of P2P paths can be combined to constitute a Point-to-Multipoint (P2MP) path, which may be referred to as a path. However, the mechanisms for requesting and computing the P2MP path across multiple areas or AS domains using the PCC and PCE are still being developed.

SUMMARY

In one embodiment, the disclosure includes an apparatus comprising a PCE configured to communicate with a PCC and compute a P2MP path across an AS domain.

In another embodiment, the disclosure includes a network component comprising at least one processor configured to implement a method comprising obtaining a computation request for a P2MP path across a plurality of AS domains, attempting to calculate the P2MP path across the AS domains, thereby generating a computed path or a failure reason, and transmitting a reply comprising the computed path or an indication of the failure reason.

In yet another embodiment, the disclosure includes a method comprising exchanging a request message and a reply message about a P2MP path across an AS domain between a PCC and a PCE.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for providing mechanisms for handling P2MP path or P2P path computations between a PCC and PCE. Accordingly, the paths may be computed across a single area or AS domain or across multiple areas or AS domains. The mechanisms may comprise declaring path computation capabilities between the PCC and PCE, for instance, using session establishment messages. The PCC and PCE may exchange a request message and reply message to compute new paths, to add branches to existing paths, or to store, delete, or re-optimize paths. Specifically, the messages exchanged between the PCC and PCE may indicate whether the computation request or reply is related to a P2MP path or P2P path. Additionally, the messages may comprise path computation information, which may be used to request or compute the path. For instance, the messages may comprise a request/reply (RP) object that indicates a P2MP path or P2P path related message and an end-points object that specifies a source and at least one destination node for the path. The reply message may also comprise an error object that indicates a computation failure, at least some nodes in the request message that may not be used, or both.

Figure 1:
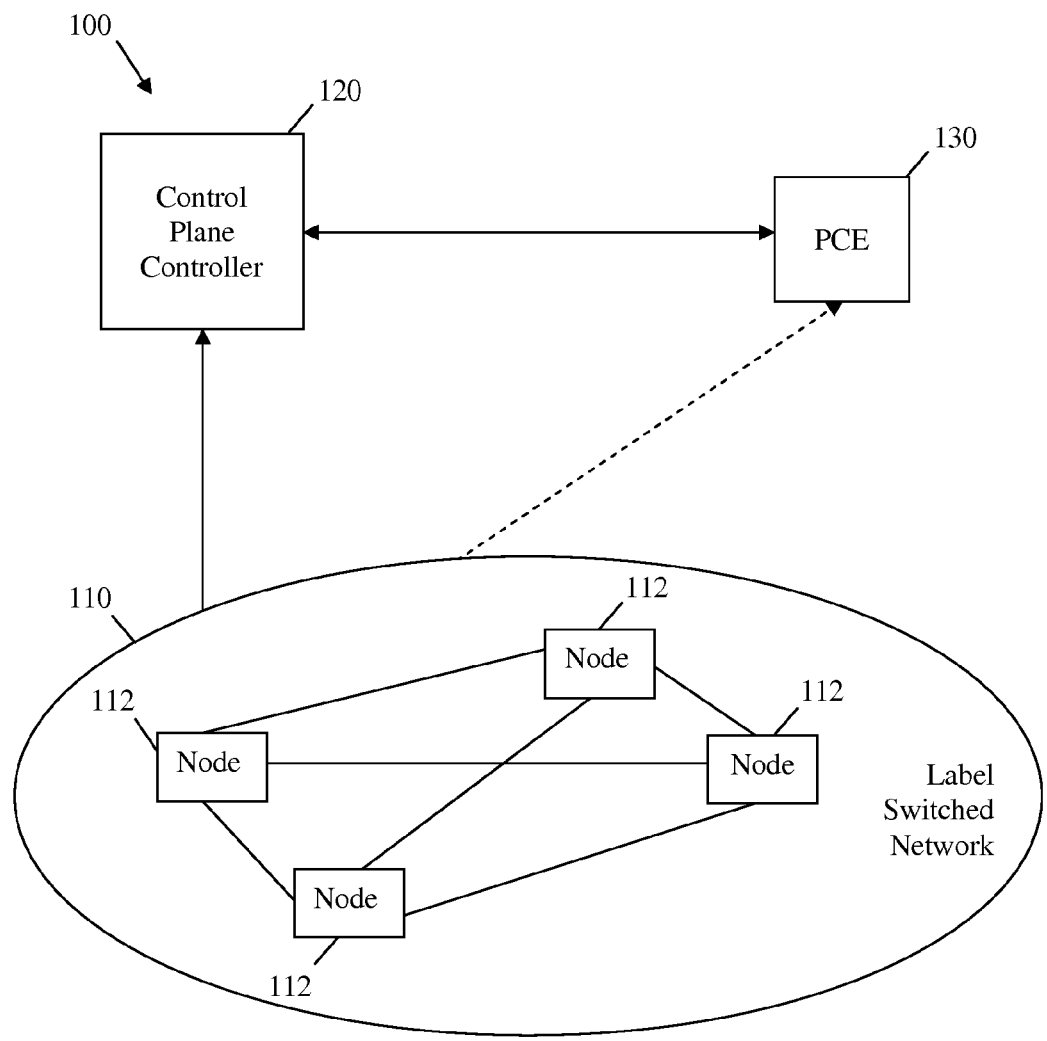
FIG. 1 is a schematic diagram of an embodiment of a label switched system.

FIG. 1 illustrates one embodiment of a label switched system 100, where P2P TE LSPs and P2MP TE LSPs may be established between at least some of the components. The label switched system 100 may comprise a label switched network 110, a control plane controller 120, and a PCE 130. The label switched network 110, control plane controller 120, and PCE 130 may communicate with each other via optical, electrical, or wireless means.

In an embodiment, the label switched network 110 may be a packet switched network, where data traffic may be transported using packets or frames along network paths or routes. The packets may be routed or switched along a Traffic Engineering (TE) Label Switched Path (LSP) established by a signaling protocol, such as MPLS or GMPLS, based on a path computed or given. The label switched network 110 may comprise a plurality of nodes 112 coupled to one another using optical, electrical, or wireless links.

In an embodiment, the nodes 112 may be any devices or components that support transportation of the packets through the label switched network 110. For example, the nodes 112 may include bridges, switches, routers, or various combinations of such devices. The nodes 112 may comprise a plurality of ingress ports for receiving packets from other nodes 112, logic circuitry that determines which nodes 112 to send the frames to, and a plurality of egress ports for transmitting frames to the other nodes 112. In some embodiments, at least some of the nodes 112 may be LSRs, which may be configured to modify or update the labels of the packets transported in the label switched network 110. Further, some of the nodes 112 may be label edge routers (LERs), for example those at the edges of the label switched network 110, which may be configured to insert or remove the labels of the packets transported between the switched network 110 and external networks. The first node 112 and the last node 112 along a path are sometimes referred to as the source node and the destination node, respectively. Although four nodes 112 are shown in the label switched network 110, the label switched network 110 may comprise any quantity of nodes 112.

In an embodiment, the control plane controller 120 may be configured to coordinate activities within the label switched network 110, such as a Network Management System (NMS) or Operations Support System (OSS). Specifically, the control plane controller 120 may receive routing requests from the label switched network 110 and provide back the corresponding path information. In addition, the control plane controller 120 may communicate with the PCE 130, for instance using a PCE Protocol (PCEP), provide the PCE 130 with information that may be used for path computation, receive the computed path from the PCE 130, and forward the computed path to at least one of the nodes 112. The control plane controller 120 may be located in a component outside of the label switched network 110, such as an external server, or may be located in a component within the label switched network 110, such as a node 112.

In an embodiment, the PCE 130 may perform all or part of the path computation for the label switched system 110. Specifically, the PCE 130 may receive the information that may be used for computing the path from the control plane controller 120, from the node 112, or both. The PCE 130 may process the information to obtain the path. For instance, the PCE 130 may compute the path, and determine the nodes 112 including the LSRs along the path. The PCE 130 may then send all or part of the computed path information to the control plane controller 120 or directly to at least one node 112. Further, the PCE 130 may be coupled to or comprise a traffic-engineering database (TED), a P2MP Path database (PDB), a P2P path database, an optical performance monitor (OPM), a physical layer constraint (PLC) information database, or combinations thereof, which may be used to compute the path. The PCE 130 may be located in a component outside of the label switched network 110, such as an external server, or may be located in a component within the label switched network 110, such as a node 112.

In an embodiment, the path computation request may be sent to the PCE 130 by a PCC. The PCC may be any client application requesting a path computation to be performed by the PCE 130. The PCC may also be any network component that makes such a request, such as the control plane controller 120, or any node 112, such as a LSR. For instance, the PCC may request from the PCE a P2MP path or P2P path. Additionally, the PCC may send the PCE 130 at least some of the path required information.

In an embodiment, the packets transported between network nodes, such as the nodes 112, are referred to as label switched packets, and may comprise labels that may be used to switch the packets along the nodes of a computed path. A path computed or given and signaled by MPLS for transporting or routing the label switched packets is referred to as a LSP. For example, the LSP may be a TE LSP established using a Resource Reservation Protocol—Traffic Engineering (RSVP-TE). The LSP may be a P2P TE LSP that extends from a source node to a destination node and may be unidirectional, where the packets may be transported in one direction along the path, e.g., from the source node to the destination node. Alternatively, the LSP may be a P2MP TE LSP, which may comprise a plurality of P2P TE LSPs that share the same source node. As such, the P2MP TE LSP may extend from a source or root node to a plurality of destination or leaf nodes. In some embodiments, the P2MP TE LSP is referred to as a P2MP tree and its P2P TE LSPs are referred to as Source-to-Leaf (S2L) sub-LSPs. Typically, the P2MP tree may be established by RSVP-TE based on a P2MP path for multicasting purposes, for example to transport the same packets to a plurality of destination nodes in label switched network.

In an embodiment, a PCC and a PCE, such as the PCE 130, may declare their capabilities related to computing or establishing paths in the network during the session establishment between the PCC and the PCE. For instance, the PCC may send the PCE a first session establishment message, which may comprise at least one flag that may be set to indicate supporting functions related to establishing a P2MP tree or P2P TE LSP. The PCE may send the PCC a second session establishment message, which may comprise at least one flag that may be set to indicate supporting related functions, such as computation of P2MP paths across multiple areas or AS domains. In an embodiment, the second session establishment message may comprise a type length value (TLV) field. The value of the TLV field may indicate the capabilities of the PCE, for instance according to a TLV type number defined by the Internet Assigned Numbers Authority (IANA). Alternatively, the second session establishment message may comprise an open object as described in the PCE Discovery protocol, which may comprise the TLV field. Thus, the PCC may communicate with a plurality of PCEs and know their different capabilities. The PCC may then request specific functions from those PCEs that may support it, such as requesting new P2MP paths only from a PCE that is configured to compute such paths.

In an embodiment, a PCC may send a request message to a PCE to add or compute a new path, for instance across multiple areas or AS domains. Specifically, the request message may comprise a first flag, which may be used to request a P2P path computation or a P2MP path computation. For instance, the first flag may be set to request a P2MP path computation from the PCE. The request message may comprise a second flag, which may be used to indicate whether the path is represented in a compressed format. In some embodiments, the request message may comprise a RP object, which may comprise the first flag and the second flag.

The request message may also comprise information that may be used for computing the P2MP path. For example, the request message may comprise path constraints, such as bandwidth limitation, maximum quantity of nodes or LSRs, shortest or longest route requirement, etc. Additionally, the request message may specify a source or root node and a plurality of destination or leaf nodes for the requested P2MP path. For example, the request message may comprise the network addresses of the source node and the destination nodes for the P2MP path. In an embodiment, the request message may comprise an end-points object, which may comprise the source node and the destination nodes' information. Alternatively, the flag may be cleared to request a P2P path computation and the request message may comprise information required to compute the P2P path. In some embodiments, the PCC may send a plurality of request messages to obtain at least one P2MP path from a plurality of PCEs 130.

In some embodiments, the path information provided to the PCE may not fit in a single request message. As such, a plurality of request messages may be sent to the PCE, where the included path information in all the messages may be combined at the PCE to compute the requested path. To associate the multiple request messages with a single path computation request, the request messages may comprise the same request IDs.

The PCE may send a reply message to the PCC in return to the request message for computing a new path. The reply message may comprise the computed path information. Specifically, the reply message may comprise a first flag, which may be used to indicate a computed P2P path or P2MP path. For instance, the first flag may be set to indicate that the reply message comprises the computed P2MP path information across multiple areas or AS domains based on a set of path constraints. Alternatively, the first flag may be cleared to indicate a P2P path computation and the reply message may comprise information related to the computed P2P path. The reply message may comprise a second flag, which may be used to indicate whether the path is represented in a compressed format. The first flag and the second flag may be included in a RP object in the reply message.

In an embodiment, the PCC may send a request message to the PCE to obtain a plurality of new S2L paths for an existing P2MP path. The existing P2MP path may be previously computed using a request message or may be configured by the PCC. The request message may comprise the existing P2MP path information, such as the path nodes and branches. Additionally, the request message may comprise information to add new branches to the P2MP path, such as the network addresses of new destination nodes. Accordingly, the PCE may use the information in the request message to add new branches to the existing P2MP path, for example using the new destination nodes as leaf nodes. To indicate an existing P2MP path, the request message may comprise a P2MP path ID associated with the existing P2MP path. The existing P2MP path may be previously computed and stored at the PCE, for instance in a P2MP Path database (PDB).

The PCE may send a reply message to the PCC in return to a request for adding new branches to an existing P2MP path. The reply message may comprise a plurality of branches, such as S2L paths, to the existing P2MP path. Additionally, the reply message may comprise a flag that may be set to indicate that the computed information is related to a P2MP path. In some embodiments, the reply message may also comprise path constraints associated with the computed or modified path. Further, the reply message may comprise the P2MP path ID associated with the computed or modified path.

In an embodiment, the PCC and the PCE may negotiate whether the PCE may store the computed path information. For instance, the PCC may send the PCE a request message to store the path information and the PCE may return to the PCC a reply message to indicate whether the PCC request has been accepted. In some embodiments, the PCC may send the PCE a request message to add branches or leaf nodes to an existing path, and to store the new information at the PCE. The request message may comprise the P2MP path ID or P2P path ID in addition to information about the new leaf nodes, e.g., the network addresses of the leaf nodes. If the PCE accepts to store the path information, the PCE may store the computed path, for instance at the PDB, and send back a reply message to the PCC confirming that the information has been stored. The reply message may comprise the P2MP path ID or P2P path ID for the stored path. The PCC may receive the reply message and match the P2MP path ID or P2P path ID of the reply message to the P2MP path ID or P2P path ID of the request message.

If the PCE does not accept to store the path information, the PCE may return a reply message to the PCC to indicate that the computed path may not be stored at the PCE. Alternatively, the PCE may not return a reply message to the PCC to indicate that the PCE may not store the computed path information. In an embodiment, the PCC may wait for a predetermined time interval to detect a reply message from the PCE. If the PCC does not receive the reply message after the time interval expires, the PCC may send subsequent request messages to the PCE without P2MP path IDs or P2P path IDs.

In other embodiments, the PCC and the PCE may negotiate whether the PCE may store the computed path or the path information during session establishment between the PCC and the PCE. For instance, the PCC may send the PCE a first session establishment message to request storing the path information and the PCE may return to the PCC a second session establishment message, which may indicate whether the PCE will store the information.

In an embodiment, the PCC may send the PCE a request message to delete an existing path. The existing path information may be stored at the PCE, for instance at the PDB.

Specifically, the request message may comprise a flag, which may be used to indicate a request to delete an existing P2MP path or P2P path. Additionally, the request message may comprise the P2MP path ID or P2P path ID associated with the existing path. In some embodiments, the request message may be used to delete a plurality of existing paths. For instance, the request message may comprise a plurality of P2MP path IDs or P2P path IDs associated with the existing paths. In other embodiments, the request message may be used to delete all existing paths. For instance, the request message may comprise a global or "wild card" P2MP path ID or P2P path ID associated with all the existing paths.

In return to such request message, the PCE may send a reply message to the PCC to confirm whether the path has been deleted. The reply message may comprise a flag, which may be used to confirm deleting a P2MP path or P2P path. Additionally, the reply message may comprise at least one P2MP path ID or P2P path ID to indicate the deleted path to the PCC. Alternatively, the reply message may comprise a global or "wild card" P2MP path ID or P2P path ID to confirm the deletion of all the existing paths.

In some embodiments, the PCC may send a request message to the PCE to re-optimize an existing P2MP path or P2P path. For instance, the request message may indicate whether at least one or all the branches of an existing P2MP path are to be optimized. As such, the request message may comprise a plurality of nodes or paths that may be added, deleted, replaced, or combinations thereof. The nodes or paths may be represented using end-points objects, record route objects (RROs), or both and may be located across multiple areas or AS domains. The PCE may use such information to re-compute at least some of the branches of the path.

In some cases, the PCE may not complete the path computation as requested, for example based on a set of constraints. As such, the PCE may send a reply message to the PCC that indicates an unsuccessful path computation attempt. The reply message may comprise a PCEP-error object, which may comprise an error-value and error-type based on the PCEP. Hence, the request message may be rejected and the path computation request may be canceled.

Figure 2:
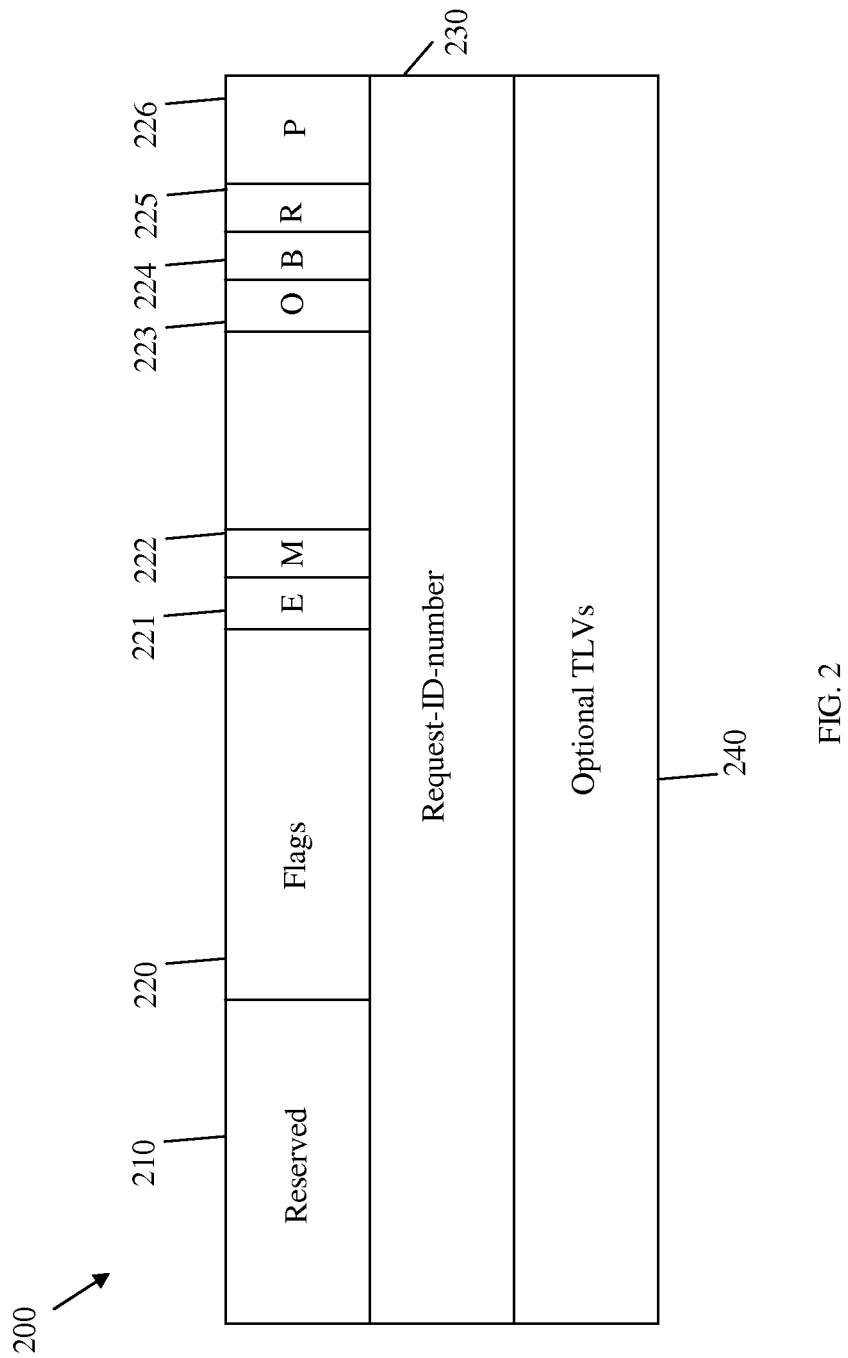
FIG. 2 is an illustration of one embodiment of a request/reply object.

FIG. 2 is an embodiment of a RP object 200, which may be a part of the request message transmitted from the PCC or the reply message transmitted from the PCE. The RP object may indicate a P2MP path or P2P path related message. The RP object 200 may comprise a Reserved field 210, a plurality of Flags 220, and a Request-ID-number 230. Additionally, the RP object 200 may optionally comprise at least one TLV 240, for instance to indicate path computation capabilities, path constraints, or other path information. The Flags 220 may comprise an explicit route object (ERO)-compression bit (E) flag 221, a P2MP bit (M) flag 222, a Strict/Loose bit (O) flag 223, a Bi-directional bit (B) flag 224, a re-optimization (R) flag 225, and a plurality of Priority bit (P) flags 226. The Flags 220 may also comprise additional bits, which may be unassigned or reserved. For instance, the remaining bits may be set to zero and ignored. In an embodiment, each of the E flag 221, M flag 222, O flag 223, B flag 224, and R flag 225 may have a length of about one bit, the P flags may have a combined length of about three bits, the Request-ID-number 230 may have a length of about 32 bits, and the Reserved field 210 may have a length of about eight bits.

In an embodiment, the E flag 221 may be set to indicate that the path information is represented in a compressed format or may be cleared otherwise. The M flag 222 may be set to indicate whether the request message or reply message is related to a P2MP path or P2P path computation. Further, at least some of the fields of the RP object 200 may be configured based on the PCEP. For instance, the Reserved field 210 may be reserved for other purposes and/or may not be used. The O flag 223 may be set in a request message to indicate that a loose path is acceptable or may be cleared to indicate that a path comprising exclusively strict hops is required. On the other hand, the O flag 223 may be set in a reply message to indicate that the computed path is loose or may be cleared to indicate that the computed path comprises strict hops. The B flag 224 may be set to indicate that a path computation request relates to at least one bidirectional P2P TE LSP or S2L sub-LSP, which may have the same TE requirements in each direction, such as fate sharing, protection and restoration, LSRs, TE Links, resource requirements (e.g., latency and jitter), etc. Otherwise, the B flag 224 may be cleared to indicate that the LSP is unidirectional. The R flag 225 may be set to indicate that a computation request relates to re-optimizing an existing path or branch. The P flags 226 may be used to specify a recommended request priority. For instance, the P flags 226 may have a value from about one to about seven, which may be set locally at the PCC. Alternatively, the P flags 226 may be set to zero when the request priority is not specified. The Request-ID-number 230 may be combined with the source IP address of the PCC or the PCE network address to identify the path computation request context. The Request-ID-number may be changed or incremented each time a new request is sent to the PCE.

Figure 3:
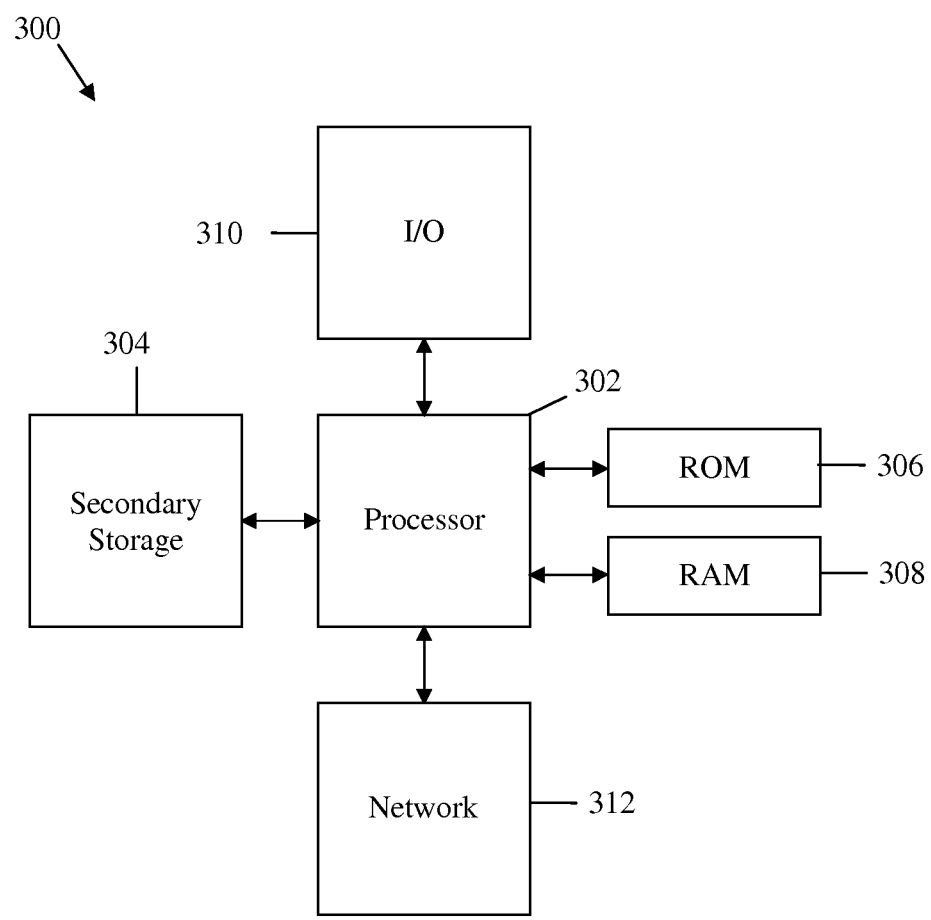
FIG. 3 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 3 illustrates a typical, general-purpose network component 300 suitable for implementing one or more embodiments of the components disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor 302 may be implemented as one or more CPU chips, or may be part of one or more application specific integrated circuits (ASICs).

The secondary storage 304 is typically comprised of one or more disk drives or erasable programmable ROM (EPROM) and is used for non-volatile storage of data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage 304. The RAM 308 is used to store volatile data and perhaps to store instructions. Access to both ROM 306 and RAM 308 is typically faster than to secondary storage 304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a path computation element (PCE) configured to:
receive a PCE path (PCEP) request message from a path computation client (PCC) in an area or an autonomous system (AS) domain, wherein the PCEP request message requests the addition of a plurality of destination addresses to an existing point-to-multipoint (P2MP) path, which traverses a plurality of nodes and crosses the area and a plurality of other areas, or the AS and a plurality of other AS domains, or both; and
transmit a PCEP reply message comprising a plurality of new branches to the P2MP path, wherein each branch extends to a leaf that corresponds to one of the destination addresses.

2. The apparatus of claim 1, wherein the PCEP request message comprises a P2MP path identifier (ID) of the existing P2MP path.

3. The apparatus of claim 1, wherein the PCE is further configured to access a P2MP path database (PDB) that stores and maintains information associated with the existing P2MP path.

4. The apparatus of claim 1, wherein the PCC is a network component that lacks the ability to compute P2MP paths crossing the area and the other areas, or the AS and the other AS domains, and wherein the PCC is a component of a label switched router (LSR).

5. The apparatus of claim 1, wherein the PCEP request message comprises the contents of the existing P2MP path, and wherein the contents of the existing P2MP path are represented using record route objects (RROs) and end-points objects that specify a source Internet Protocol (IP) address and a plurality of destination IP addresses for the path.

6. The apparatus of claim 1, wherein customer data traffic was carried over the existing P2MP path before the PCEP request message was received from the PCC.

7. The apparatus of claim 6, wherein the existing P2MP path was established using a first PCEP request message and a first PCEP reply message communicated between the PCC and PCE prior to the communication of the PCEP request message and the PCEP reply message.

8. The apparatus of claim 7, wherein the first PCEP request message comprised a source address and a plurality of original destination addresses, and wherein the source address identifies the root of the existing P2MP path and the original destination addresses identify original leaves of the existing P2MP path.

9. The apparatus of claim 8, wherein the first PCEP reply message comprised information used to establish the existing P2MP path.

10. A method comprising:
receiving a path computation element (PCE) protocol (PCEP) request from a path computation client (PCC) that requests the addition of a plurality of destination addresses to an existing point-to-multipoint (P2MP) path that traverses a plurality of nodes, wherein traffic is carried over the existing P2MP path before the PCEP request message is received; and
computing a plurality of additional branches for the existing P2MP path,
wherein the each of the branches extend to a leaf that corresponds to one of the destination addresses.

11. The method of claim 10, wherein the PCEP request message comprises a P2MP path identifier (ID) of the existing P2MP path.

12. The method of claim 10, wherein the PCC is a component of a label switched router (LSR).

13. The method of claim 10, wherein the PCEP request comprises a plurality of request messages each comprising a common request identifier (ID) and a different sub request identifier (S-ID), wherein the S-IDs distinguish the request messages from each other.

14. A method comprising:
receiving a request or reply message comprising a request/reply (RP) object comprising a flag bits field,
wherein an explicit route object (ERO)-compression (E) bit in the flag bits field of the RP object signals to the receiver of the message that a path is in the compressed format or is not in the compressed format,
wherein a re-optimization request for the path is specified by the use of a re-optimization (R) bit within the RP object,
wherein the request message further comprises an END-POINTS object that specifies a source internet protocol (IP) address and a plurality of destination IP addresses of the path for which a path computation was requested, and
wherein the path traverses a plurality of nodes.

15. The method of claim 14, wherein a fragmentation bit (F-bit) in the flag bits field of the RP object indicates to the receiver that the request is part of a fragmented request, or is not a fragmented request.

16. The method of claim 15, wherein the F-bit is used in the RP object to signal that an initial request or response was too large to fit into a single message and will be fragmented into multiple messages, and wherein in order to identify the single request or response, each message uses the same request identifier(ID).

17. The method of claim 14, wherein a point-to-multipoint (P2MP) bit in the flag bits field of the RP object signals to the receiver of the message that the request/reply is for P2MP or is not for P2MP.

18. The method of claim 14, wherein the path is a point-to-multipoint (P2MP) traffic engineered (TE) path, and wherein a re-optimization request for the P2MP TE path is specified by the use of a re-optimization (R) bit within the RP object.

19. The method of claim 14, wherein the request or reply message is received by or sent from a Path Computation Client (PCC) that lacks the ability to compute P2MP paths.

* * * * *